US011953182B1

(12) United States Patent
Wang et al.

(10) Patent No.: US 11,953,182 B1
(45) Date of Patent: Apr. 9, 2024

(54) EMERGENCY LIGHTING DEVICE WITH HIGH SAFETY

(71) Applicant: Xiamen PVTECH Co., Ltd., Fujian (CN)

(72) Inventors: Sijia Wang, Fujian (CN); Liangliang Cao, Fujian (CN); Fuxing Lu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/241,908

(22) Filed: Sep. 4, 2023

(51) Int. Cl.

| | |
|---|---|
| ***F21V 19/00*** | (2006.01) |
| ***F21S 9/02*** | (2006.01) |
| *F21V 23/04* | (2006.01) |
| *F21Y 103/20* | (2016.01) |

(52) U.S. Cl.
CPC .......... *F21V 19/0085* (2013.01); *F21S 9/022* (2013.01); *F21V 23/04* (2013.01); *F21Y 2103/20* (2016.08)

(58) Field of Classification Search
CPC ............................ F21V 19/0085; F21S 9/022
See application file for complete search history.

(56) References Cited

U.S. PATENT DOCUMENTS

2016/0327216 A1* 11/2016 Gielen ................ F21V 23/0457

* cited by examiner

*Primary Examiner* — Joseph L Williams
(74) *Attorney, Agent, or Firm* — Winston Hsu

(57) ABSTRACT

An emergency lighting device with high safety includes a fixture base, two holders and a light tube. The holders are disposed on the fixture base. Each of the holder includes a holder body, two conductive plates and a rotational fixture. The conductive plates are disposed in the holder body and the rotational fixture is disposed in the central recess of the holder body. The light tube has two end caps and a tube body. The end caps are installed on the holders respectively. Each of the end caps has a non-conductive pin and two conductive pins inserted into the rotational fixture of one of the holders, such that the conductive pins of the end cap contact the conductive plates of the holder respectively.

10 Claims, 11 Drawing Sheets

EMERGENCY LIGHTING DEVICE WITH HIGH SAFETY

BACKGROUND OF THE INVENTION

1. Field of the Invention

The present invention relates to a lighting device, in particular to an emergency lighting device with high safety.

2. Description of the Prior Art

Emergency lighting devices have been comprehensively applied to many buildings or workplaces. Currently available emergency lighting devices can be automatically charged when the utility power normally operates and provide the lighting function during a power failure.

However, if the currently available emergency lighting devices are incorrectly installed, these lighting devices tend to be damaged, which cause the decrease of the service lives of these lighting devices.

Besides, the currently available emergency lighting devices do not provide the color temperature adjusting function, which limits the application range of these lighting devices.

Further, the currently available emergency lighting devices do not provide the operating state monitoring function, so the users cannot effectively monitor the operating state of these lighting devices.

SUMMARY OF THE INVENTION

One embodiment of the present invention provides an emergency lighting device with high safety, which includes a fixture base, two holders and a light tube. The holders are disposed on the fixture base. Each of the holder includes a holder body, two conductive plates and a rotational fixture. The conductive plates are disposed in the holder body and the rotational fixture is disposed in the central recess of the holder body. The light tube has two end caps and a tube body. The end caps are installed on the holders respectively. Each of the end caps has a non-conductive pin and two conductive pins inserted into the rotational fixture of one of the holders, such that the conductive pins of the end cap contact the conductive plates of the holder respectively.

In one embodiment of the present invention, each of the holders further includes three top holes disposed on the top of the holder body.

In one embodiment of the present invention, the emergency lighting device further includes a fixing element disposed in one of the top holes of one of the holders.

In one embodiment of the present invention, each of the holders further includes a fixing base disposed in the holder body thereof and the conductive plates of the holder are fixed at the fixing base of the holder.

In one embodiment of the present invention, each of the holders further includes a central post disposed in the central recess of the holder body thereof. The rotational fixture of the holder has a middle hole and the central post of the holder penetrates through the middle hole of the rotational fixture of the holder, such that the rotational fixture of the holder is rotatably connected to the central post of the holder.

In one embodiment of the present invention, the rotational fixture has a first positioning block set including two first positioning blocks, a second positioning block set including two second positioning blocks, a third positioning block set including two third positioning blocks and a fourth positioning block set including two fourth positioning blocks. The first positioning block set is opposite to the third positioning block set. The second positioning block set is opposite to the fourth positioning block set.

In one embodiment of the present invention, one of the conductive plates contacts the second positioning block set and the other of the conductive plates contacts the fourth positioning block set.

In one embodiment of the present invention, one of the conductive pins of one of the end caps presses against the outer side of one of the second positioning blocks. The other of the conductive pins of the end cap presses against the outer side of one of the fourth positioning blocks. The non-conductive pin of the end cap is disposed between the third positioning blocks.

In one embodiment of the present invention, the emergency lighting device further includes a color temperature adjusting button disposed on the light tube.

In one embodiment of the present invention, the emergency lighting device further includes an operating state test button disposed on the light tube.

The emergency lighting device with high safety in accordance with the embodiments of the present invention may have the following advantages:

(1) In one embodiment of the present invention, the emergency lighting device with high safety includes a fixture base, two holders and a light tube. The two holders are disposed on the fixture base. Each of the holder includes a holder body, two conductive plates and a rotational fixture. The conductive plates are disposed in the holder body and the rotational fixture is disposed in the central recess of the holder body. The light tube has two end caps and a tube body. The end caps are installed on the holders respectively. Each of the end caps has a non-conductive pin and two conductive pins inserted into the rotational fixture of one of the holders, such that the conductive pins of the end cap contact the conductive plates of the holder respectively. Due to the special structure designs of the end caps and the holders of the emergency lighting device can effectively avoid that the emergency lighting device is incorrectly installed, which can avoid that the emergency lighting device is damaged and prevent from electrical shock. Therefore, the service life of the emergency lighting device can be extended and the safety of the emergency lighting device can be enhanced.

(2) In one embodiment of the present invention, the end caps and the holders of the emergency lighting device have special structure designs, which make the light tube be stably fixed at the holders. Thus, the lighting device can achieve high structural stability, which can effectively prevent the light tube from dropping from the fixture base. As a result, the service life of the emergency lighting device can be further extended and the safety of the lighting device can be further enhanced.

(3) In one embodiment of the present invention, the emergency lighting device has the color temperature adjusting button, which can provide the color temperature adjusting function. The user can adjust the color temperature of the emergency lighting device according to actual requirements via the color temperature adjusting button. Thus, the emergency lighting device can be more comprehensively in application and more flexible in use.

(4) In one embodiment of the present invention, the emergency lighting device has the operating state test button, which can provide the operating state monitoring function. Therefore, the user can monitor the operating state of the emergency lighting device via the operating state test button and take the necessary measures on time, which can make sure that the lighting system can normally work.

(5) In one embodiment of the present invention, the structure design of the emergency lighting device is simple, which can make sure that the emergency lighting device can achieve the desired technical effects without significantly increasing the cost thereof. Accordingly, the emergency lighting device can achieve high practicality.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
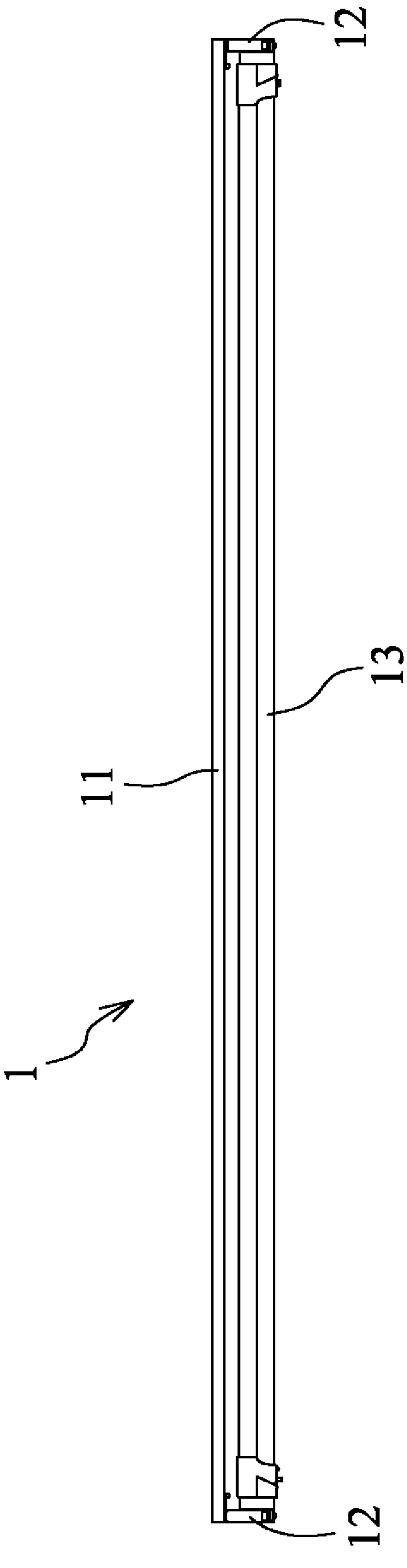
FIG. 1 is the side view of the emergency lighting device with high safety in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the side view of the emergency lighting device with high safety in accordance with one embodiment of the present invention. As shown in FIG. 1, the emergency lighting device 1 includes a fixture base 11, two holders 12 and a light tube 13. The holders 12 are disposed on the fixture base 11. The light tubes 13 are installed on the holders 12.

The embodiment just exemplifies the present invention and is not intended to limit the scope of the present invention; any equivalent modification and variation according to the spirit of the present invention is to be also included within the scope of the following claims and their equivalents.

Figure 2:
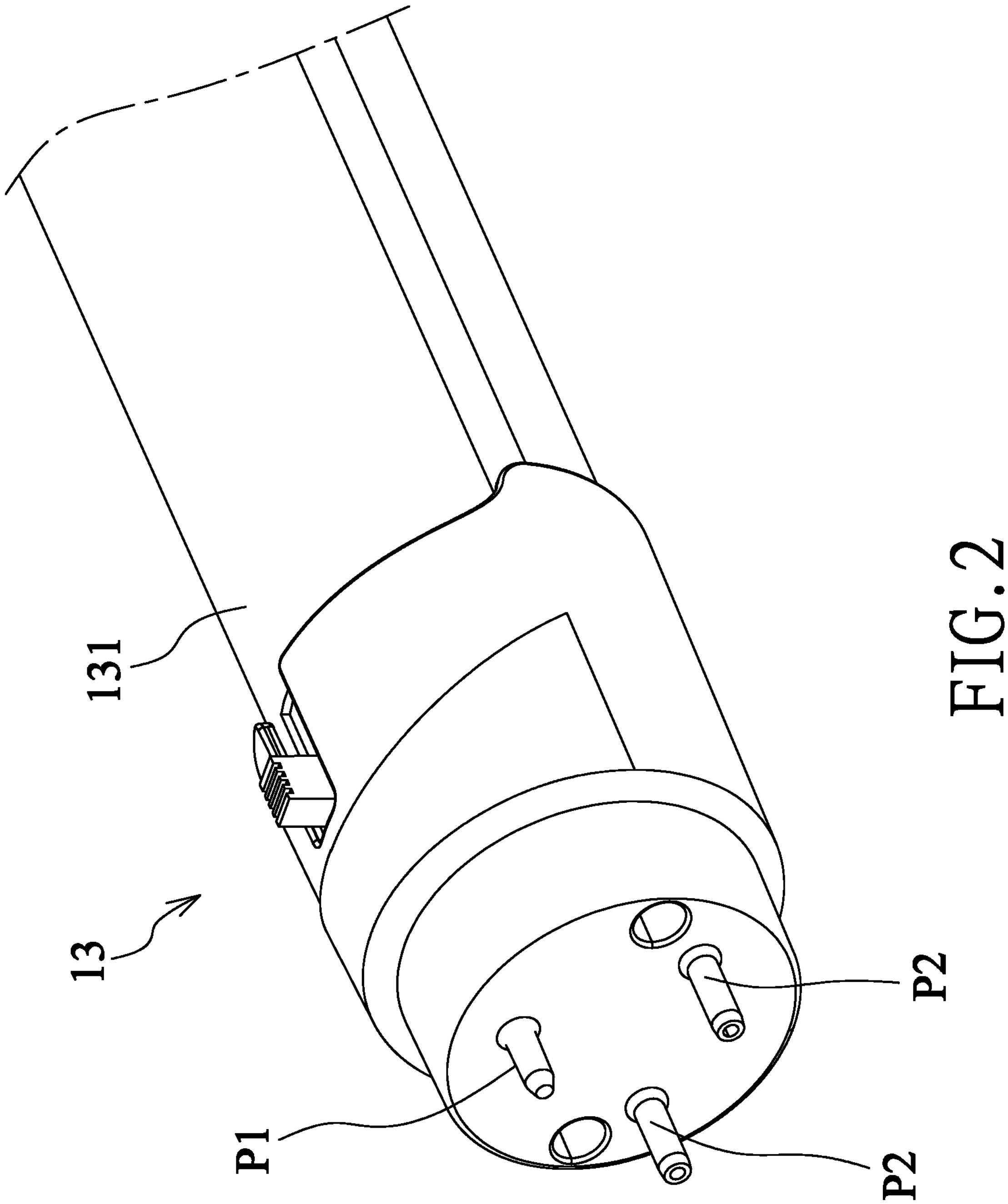
FIG. 2 is the first partial enlargement view of the emergency lighting device with high safety in accordance with one embodiment of the present invention.

Please refer to FIG. 2, which is the first partial enlargement view of the emergency lighting device with high safety in accordance with one embodiment of the present invention. As shown in FIG. 2, the light tube 13 has two end caps 132 (only one of the end caps 13 is shown in FIG. 2) and a tube body 131. The end caps 132 are installed on the holders 12 respectively. Each of the end caps 132 has a non-conductive pin P1 and two conductive pins P2. The emergency lighting device 1 further includes a light source board, a power converter, a driver and other necessary electronic components (not shown in the drawings), which may be disposed in the tube body 132 and electrically connected to the conductive pins P2 of the end caps 132. In the embodiment, the lines connecting the non-conductive pin P1 and the conductive pins P2 with each other can form an equilateral triangle. In another embodiment, the lines connecting the non-conductive pin P1 and the conductive pins P2 with each other can form an isosceles triangle.

The embodiment just exemplifies the present invention and is not intended to limit the scope of the present invention; any equivalent modification and variation according to the spirit of the present invention is to be also included within the scope of the following claims and their equivalents.

Figure 3A:
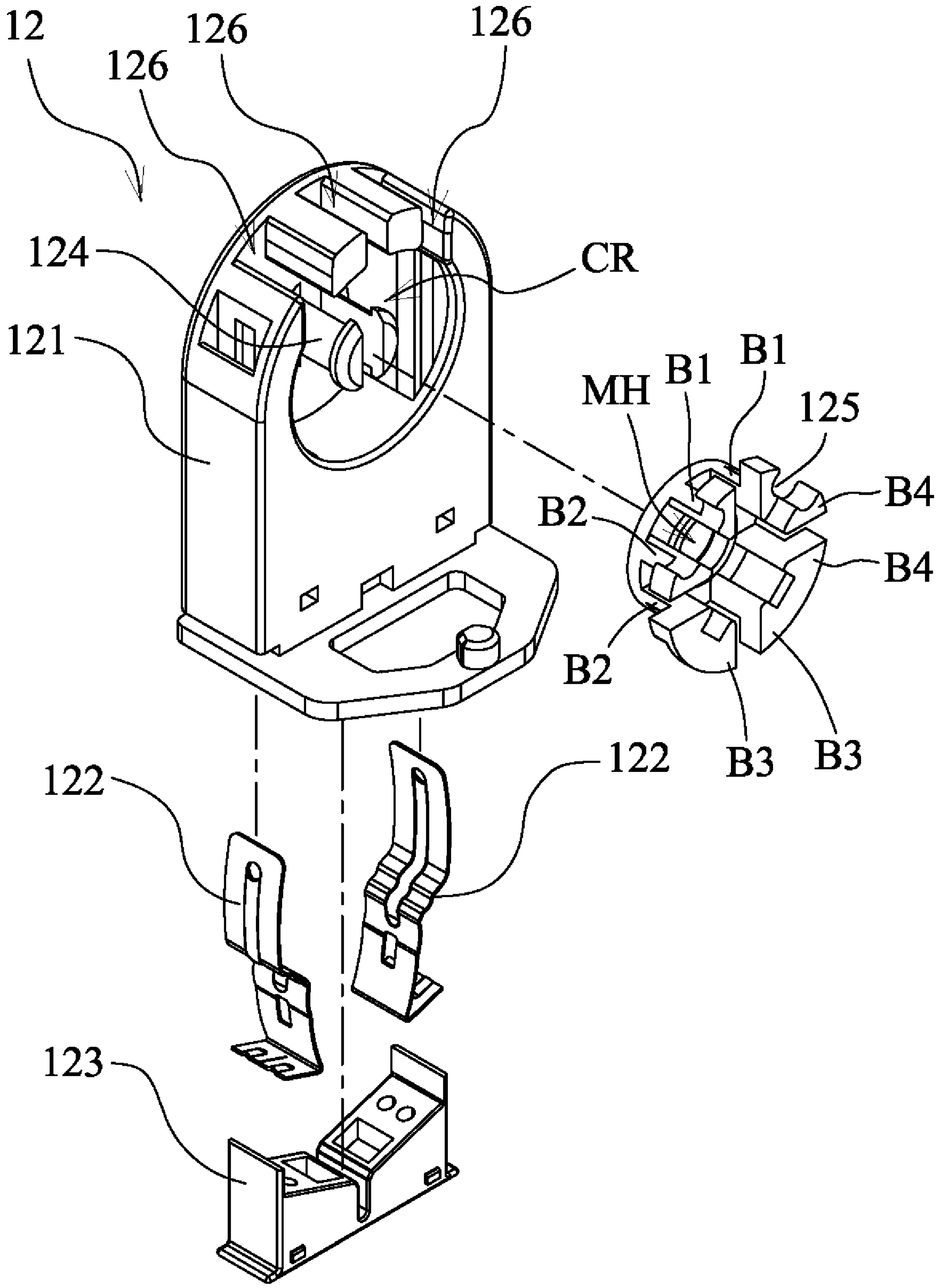
FIG. 3A is the exploded view of the holder of the emergency lighting device with high safety in accordance with one embodiment of the present invention.
Figure 3B:
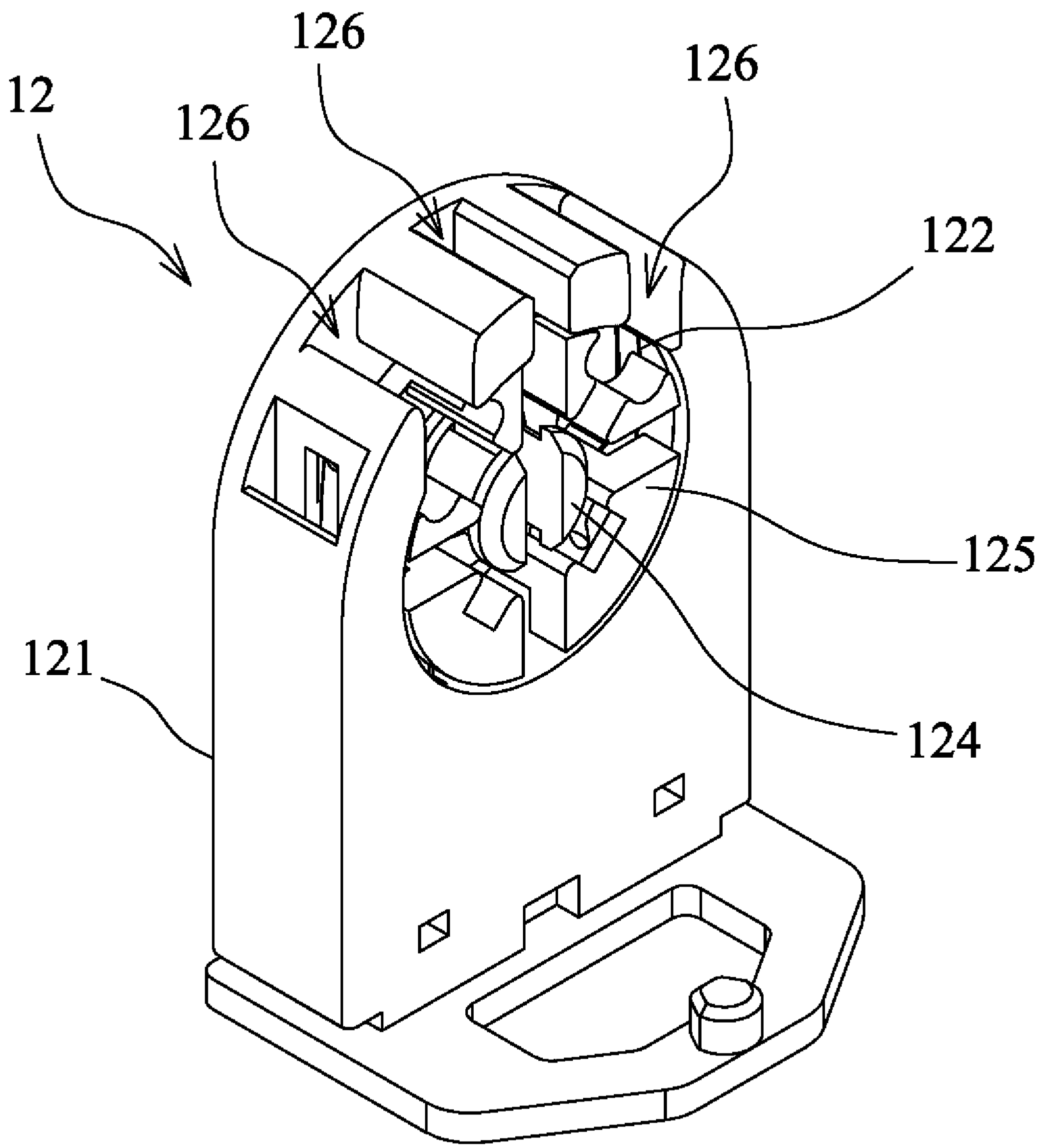
FIG. 3B is the perspective view of the holder of the emergency lighting device with high safety in accordance with one embodiment of the present invention.

Please refer to FIG. 3A and FIG. 3B. FIG. 3A is the exploded view of the holder of the emergency lighting device with high safety in accordance with one embodiment of the present invention. FIG. 3B is the perspective view of the holder of the emergency lighting device with high safety in accordance with one embodiment of the present invention. As shown in FIG. 3A and FIG. 3B, each of the holders 12 includes a holder body 121, two conductive plates 122, a fixing base 123, a central post 124, a rotational fixture 125 and three top holes 126.

The conductive plates 122 are fixed at the fixing base 123. The fixing base 123 and the conductive plates 122 are disposed in the holder body 121. The conductive plates 122 may be made of a metal material, such as copper, aluminum, iron, etc. Similarly, the fixing base 123 may be made of a metal material, such as copper, aluminum, iron, etc. The fixing bases 123 of the holders 12 are electrically connected to an external power source (e.g., a utility power).

The holder body 121 has a central recess CR. The central post 124 is disposed in the central recess CR. The rotational fixture 125 has a middle hole MH and the rotational fixture 125 is also disposed in the central recess CR, such that the central post 124 penetrates through the middle hole MH. In this way, the rotational fixture 125 can be rotatably connected to the central post 124. The top holes 126 are disposed on the top of the holder body 121.

The end caps 132 are installed on the holders 12 respectively. The non-conductive pin P1 and the conductive pins P2 of each of the end caps 132 can pass through the top holes 126 of the holder 12 corresponding thereto and then be inserted into the rotational fixture 125 of the holder 12, such that the conductive pins P2 of the end cap 132 can contact the conductive plates 122 of the holder 12 respectively.

In the embodiment, the rotational fixture 125 has a first positioning block set, a second positioning block set, a third positioning block set and a fourth positioning block set. The first positioning block set includes two first positioning blocks B1. The second positioning block set includes two second positioning blocks B2. The third positioning block set includes two third positioning blocks B3. The fourth positioning block set includes two fourth positioning blocks B4. The first positioning block set is opposite to the third positioning block set. The second positioning block set is opposite to the fourth positioning block set. After the rotational fixture 125 is installed in the central recess CR of the holder body 121, the conductive plates 122 can contact the second positioning block set and the fourth positioning block set respectively. The outer side of the first positioning block B1 is provided with a groove. The outer side of each of the first positioning block B1, the second positioning blocks B2, the third positioning blocks B3 and the fourth positioning blocks B4 is provided with a groove. The structure of the rotational fixture 125 of the embodiment is just for example; the number and the positions of the positioning block sets can be changed according to actual requirements.

The embodiment just exemplifies the present invention and is not intended to limit the scope of the present invention; any equivalent modification and variation according to the spirit of the present invention is to be also included within the scope of the following claims and their equivalents.

Figure 4:
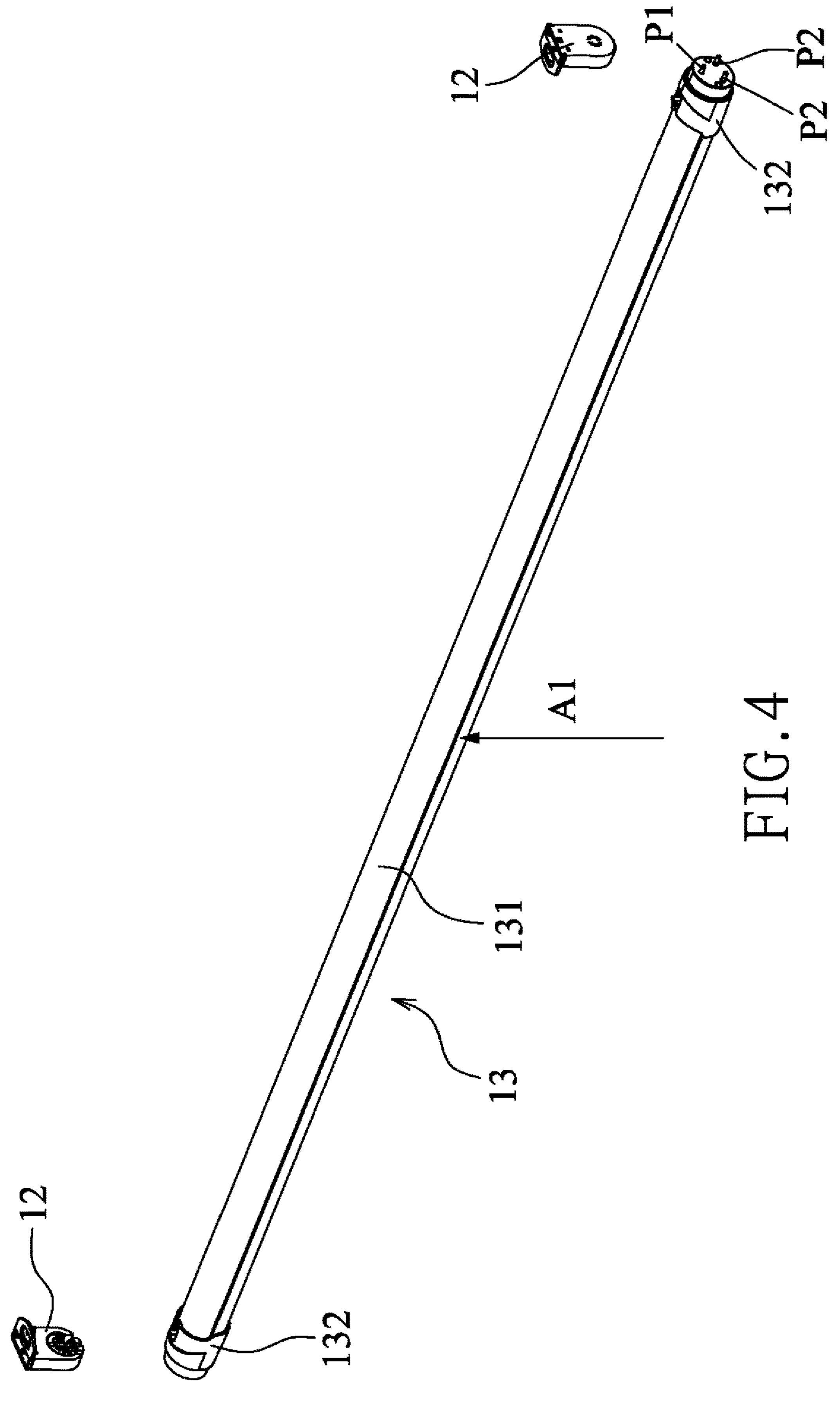
FIG. 4 is the first schematic view of the installation process of the emergency lighting device with high safety in accordance with one embodiment of the present invention.
Figure 5:
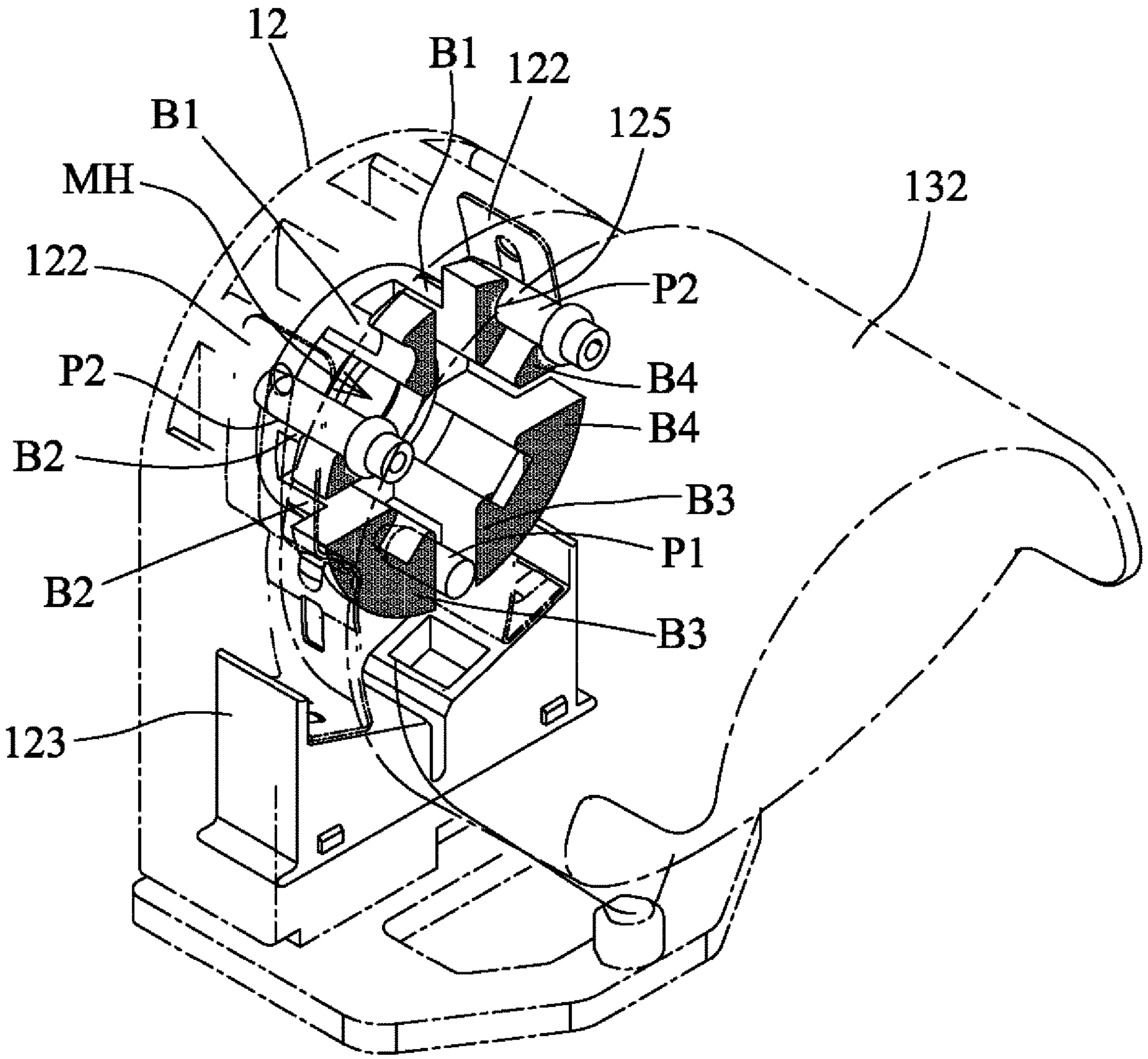
FIG. 5 is the second schematic view of the installation process of the emergency lighting device with high safety in accordance with one embodiment of the present invention.
Figure 6:
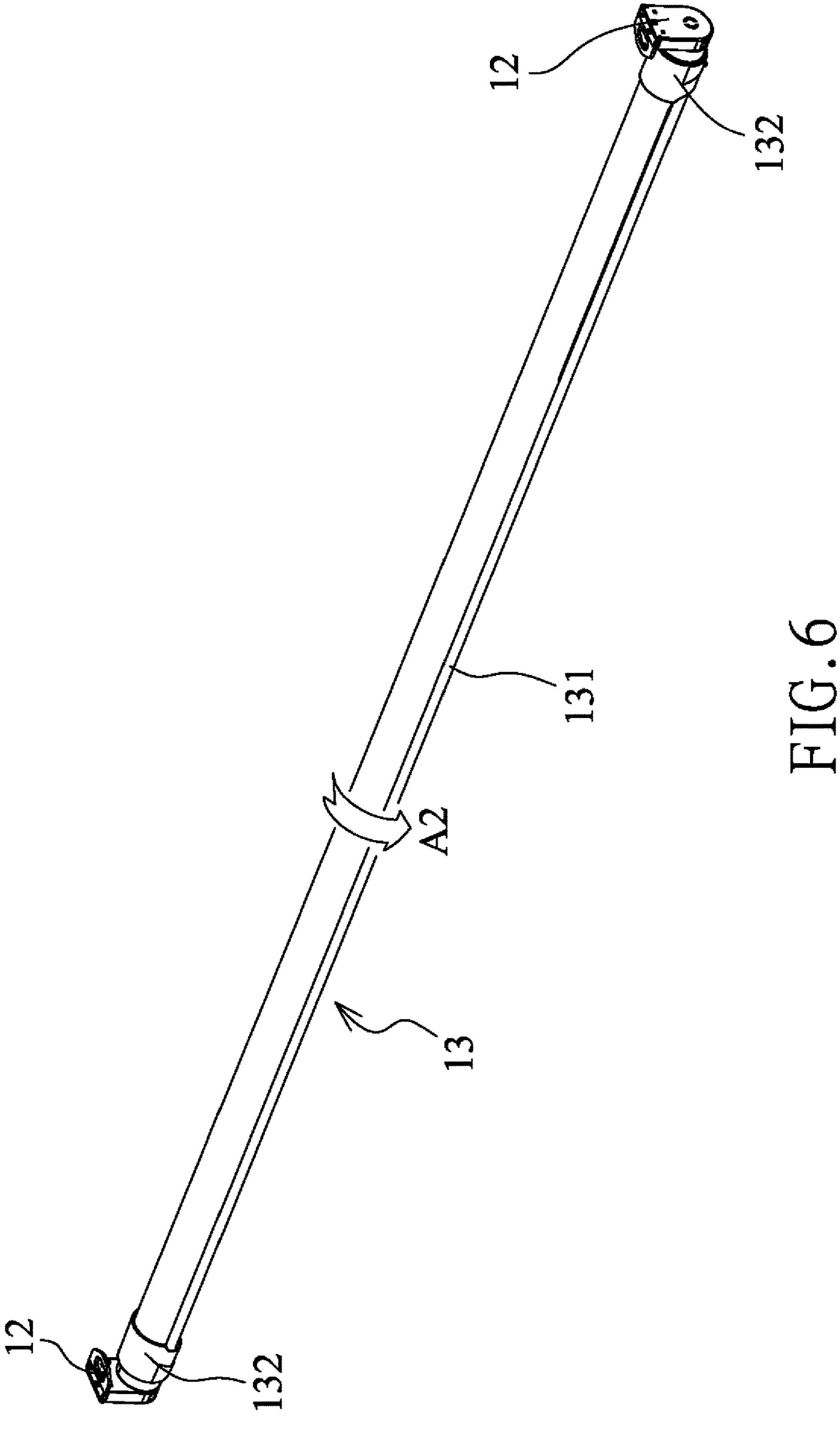
FIG. 6 is the third schematic view of the installation process of the emergency lighting device with high safety in accordance with one embodiment of the present invention.

Please refer to FIG. 4, FIG. 5 and FIG. 6. FIG. 4 is the first schematic view of the installation process of the emergency lighting device with high safety in accordance with one embodiment of the present invention. FIG. 5 is the second schematic view of the installation process of the emergency lighting device with high safety in accordance with one embodiment of the present invention. FIG. 6 is the third schematic view of the installation process of the emergency lighting device with high safety in accordance with one embodiment of the present invention. As shown in FIG. 4, the user can move the light tube 13 toward the fixture base 11 and the holders 12 in the direction of the arrow A1 (the non-conductive pins P1 face the tops of the holders 12).

As shown in FIG. 5, one of the conductive pins P2 of the end cap 13 presses against the outer side of one of the second positioning blocks B2 (the conductive pin P2 is disposed in the groove of the second positioning block B2). The other of the conductive pins P2 of the end cap 13 presses against the outer side of one of the fourth positioning blocks B4 (the conductive pin P2 is disposed in the groove of the fourth positioning block B4). The non-conductive pin P1 of the end cap 13 is disposed between the third positioning blocks B3.

As shown in FIG. 6, after the light tube 13 is inserted into the holders 12, the user can rotate the light tube 13 in the direction of the arrow A2 by 180° (the rotation angle and the rotation direction can be changed according to actual requirements). In this way, the light tube 13 can be stably fixed on the holders 12 and the conductive pins P2 of each of the end caps 132 can contact the conductive plates 122 of the holder 12 corresponding thereto.

The embodiment just exemplifies the present invention and is not intended to limit the scope of the present invention; any equivalent modification and variation according to the spirit of the present invention is to be also included within the scope of the following claims and their equivalents.

Figure 7:
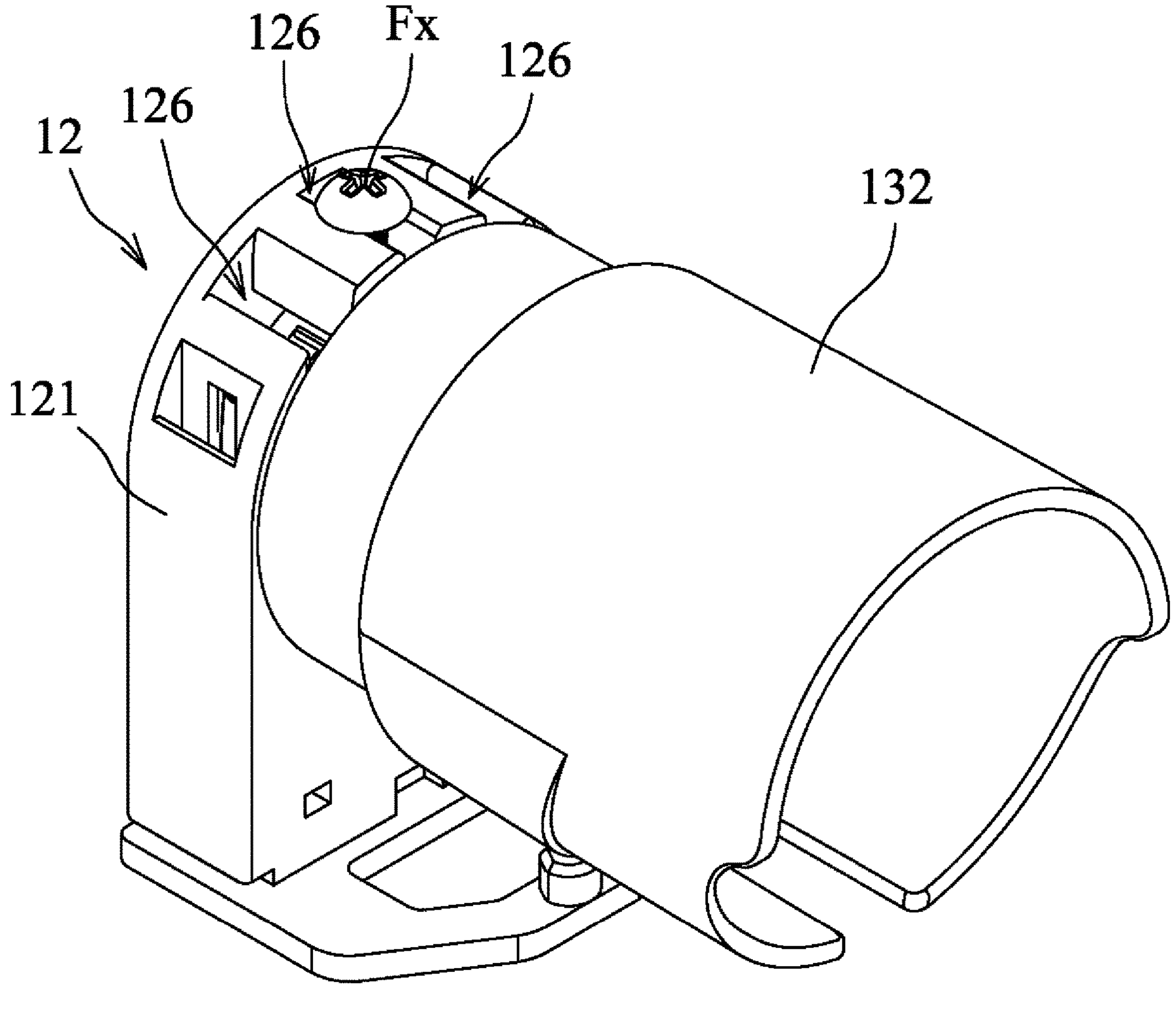
FIG. 7 is the second partial enlargement view of the emergency lighting device with high safety in accordance with one embodiment of the present invention.

Please refer to FIG. 7, which is the second partial enlargement view of the emergency lighting device with high safety in accordance with one embodiment of the present invention. As shown in FIG. 7, the emergency lighting device 1 further includes at least one fixing element Fx. The fixing element Fx is disposed in one of the top holes 126 of at least one of the holders 12. The fixing element Fx may be a screw or other similar elements. In this way, the user should remove the light tube 13 by a tool (e.g., a screwdriver), but cannot remove the light tube 13 from the holders 12 by his/her hands.

In addition, the emergency lighting device 1 may further includes a color temperature adjusting button and an operating state test button, which may be disposed on the light tube 13. Therefore, the emergency lighting device 1 can provide the color temperature adjusting function and the operating state monitoring function.

The embodiment just exemplifies the present invention and is not intended to limit the scope of the present invention; any equivalent modification and variation according to the spirit of the present invention is to be also included within the scope of the following claims and their equivalents.

It is worthy to point out that if the currently available emergency lighting devices are incorrectly installed, these lighting devices tend to be damaged, which cause the decrease of the service lives of these lighting devices. Besides, the currently available emergency lighting devices do not provide the color temperature adjusting function, which limits the application range of these lighting devices. Further, the currently available emergency lighting devices do not provide the operating state monitoring function, so the users cannot effectively monitor the operating state of these lighting devices. On the contrary, according to one embodiment of the present invention, the emergency lighting device with high safety includes a fixture base, two holders and a light tube. The two holders are disposed on the fixture base. Each of the holder includes a holder body, two conductive plates and a rotational fixture. The conductive plates are disposed in the holder body and the rotational fixture is disposed in the central recess of the holder body. The light tube has two end caps and a tube body. The end caps are installed on the holders respectively. Each of the end caps has a non-conductive pin and two conductive pins inserted into the rotational fixture of one of the holders, such that the conductive pins of the end cap contact the conductive plates of the holder respectively. Due to the special structure designs of the end caps and the holders of the emergency lighting device can effectively avoid that the emergency lighting device is incorrectly installed, which can avoid that the emergency lighting device is damaged and prevent from electrical shock. Therefore, the service life of the emergency lighting device can be extended and the safety of the emergency lighting device can be enhanced.

Also, according to one embodiment of the present invention, the end caps and the holders of the emergency lighting device have special structure designs, which make the light tube be stably fixed at the holders. Thus, the lighting device can achieve high structural stability, which can effectively prevent the light tube from dropping from the fixture base. As a result, the service life of the emergency lighting device can be further extended and the safety of the lighting device can be further enhanced.

Further, according to one embodiment of the present invention, the emergency lighting device has the color temperature adjusting button, which can provide the color temperature adjusting function. The user can adjust the color temperature of the emergency lighting device according to actual requirements via the color temperature adjusting button. Thus, the emergency lighting device can be more comprehensively in application and more flexible in use.

Moreover, according to one embodiment of the present invention, the emergency lighting device has the operating state test button, which can provide the operating state monitoring function. Therefore, the user can monitor the operating state of the emergency lighting device via the operating state test button and take the necessary measures on time, which can make sure that the lighting system can normally work.

Furthermore, according to one embodiment of the present invention, the structure design of the emergency lighting device is simple, which can make sure that the emergency lighting device can achieve the desired technical effects without significantly increasing the cost thereof. Accordingly, the emergency lighting device can achieve high practicality. As set forth above, the emergency lighting device according to the embodiments of the present invention can definitely achieve great technical effects.

Figure 8:
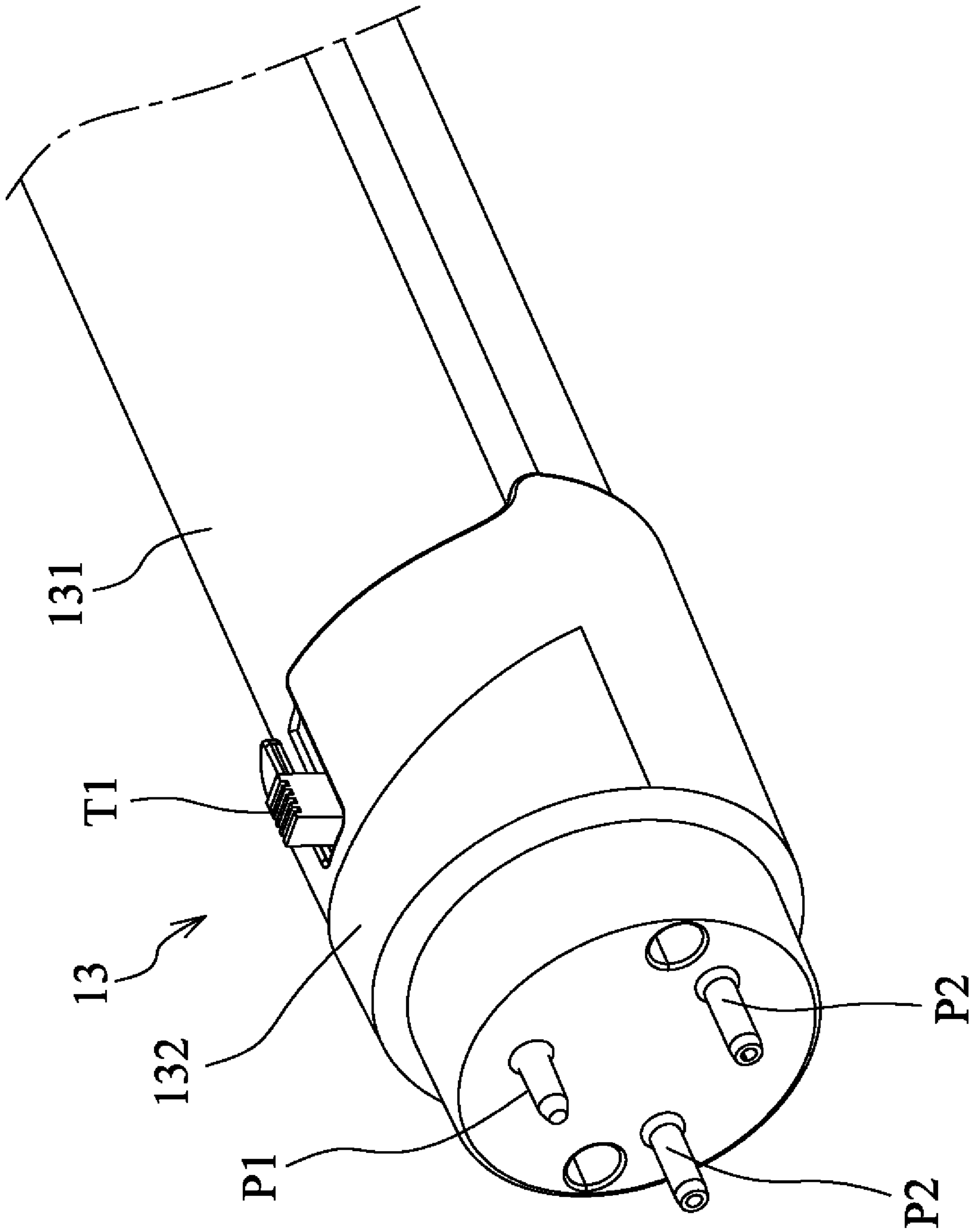
FIG. 8 is the first partial enlargement view of the emergency lighting device with high safety in accordance with another embodiment of the present invention.

Please refer to FIG. 8, which is the first partial enlargement view of the emergency lighting device with high safety in accordance with another embodiment of the present invention. Please also refer to FIG. 1 and FIG. 2. As shown in FIG. 8, the emergency lighting device 1 may further includes a color temperature adjusting button T1 and the color temperature adjusting button T1 may be disposed on the light tube 13.

The user can adjust the color temperature of the emergency lighting device 1 according to actual requirements via the color temperature adjusting button T1. Thus, the emergency lighting device 1 can be more comprehensively in application and more flexible in use.

The embodiment just exemplifies the present invention and is not intended to limit the scope of the present invention; any equivalent modification and variation according to the spirit of the present invention is to be also included within the scope of the following claims and their equivalents.

Figure 9:
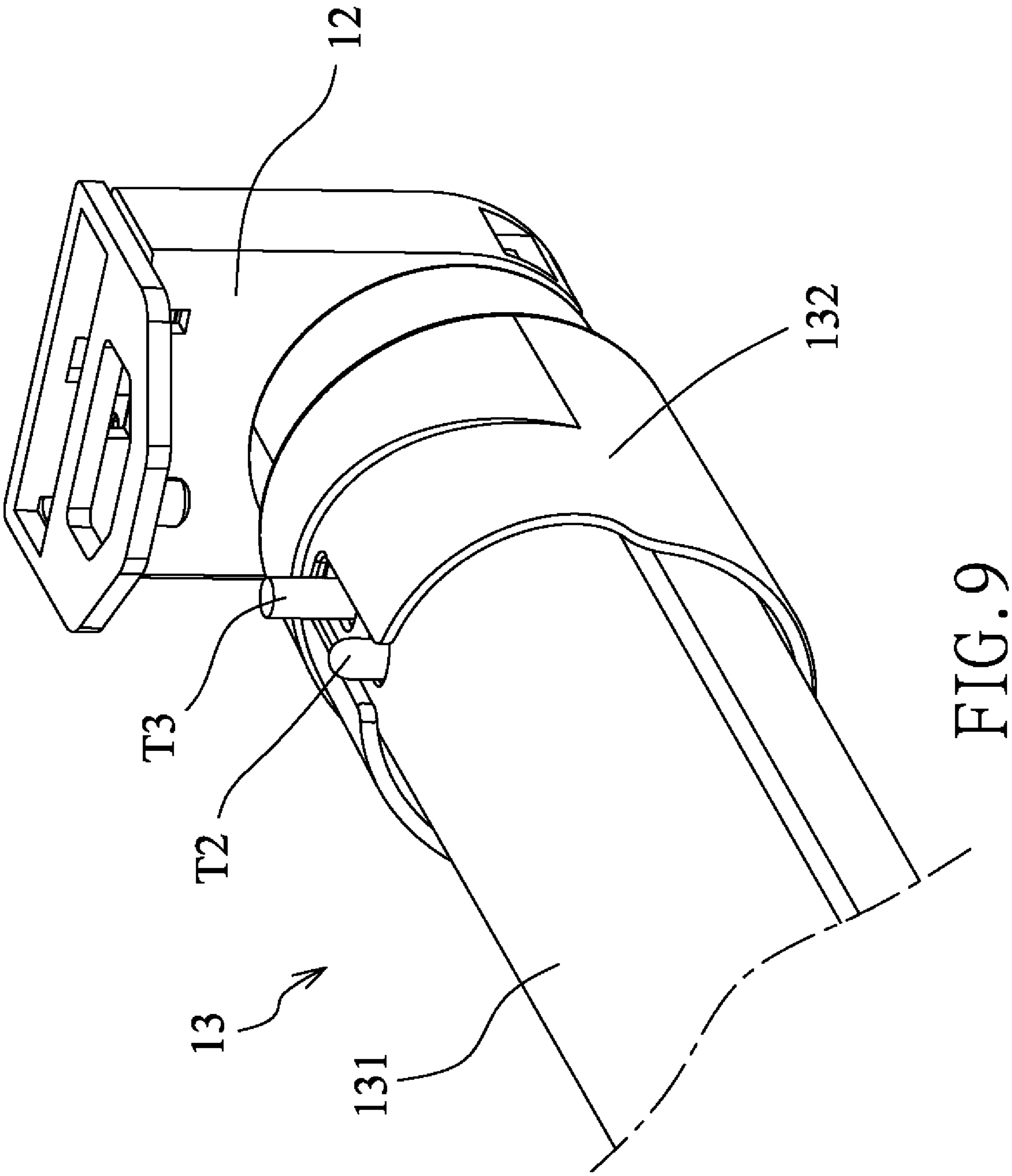
FIG. 9 is the second partial enlargement view of the emergency lighting device with high safety in accordance with another embodiment of the present invention.

Please refer to FIG. 9, which is the second partial enlargement view of the emergency lighting device with high safety in accordance with another embodiment of the present invention. Please also refer to FIG. 1 and FIG. 2. As shown in FIG. 9, the emergency lighting device 1 may further includes an operating state test button T3 and a light indicator T2, which may be disposed on the light tube 13.

Therefore, the user can monitor the operating state of the emergency lighting device 1 via the operating state test button T3 and take the necessary measures on time. The light indicator T2 can generate a warning signal when the emergency lighting device 1 malfunctions. The above mechanism can make sure that the lighting system can normally work.

The embodiment just exemplifies the present invention and is not intended to limit the scope of the present invention; any equivalent modification and variation according to the spirit of the present invention is to be also included within the scope of the following claims and their equivalents.

Figure 10:
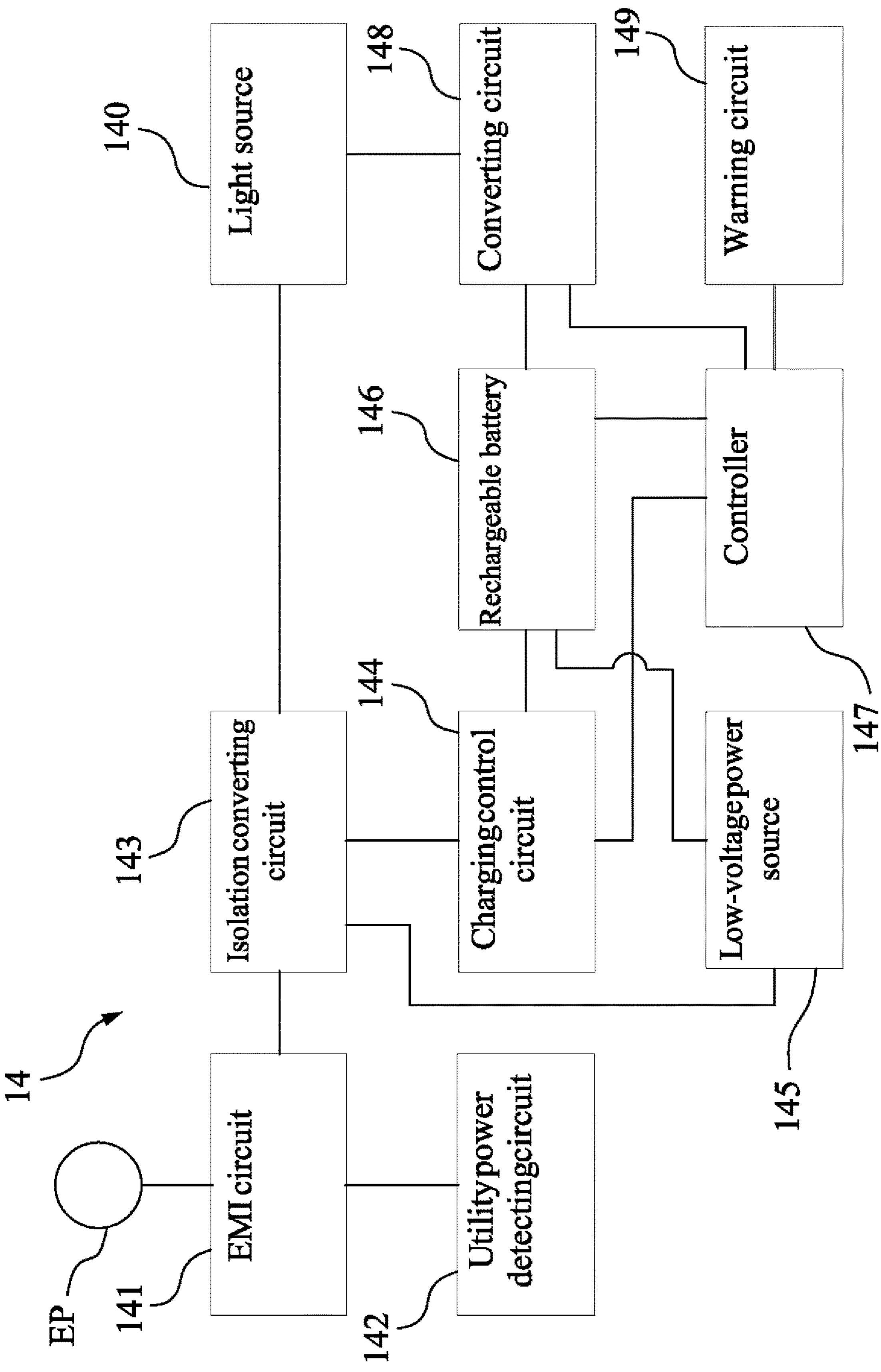
FIG. 10 is the circuit structure of the light source board of the emergency lighting device with high safety in accordance with another embodiment of the present invention.

Please refer to FIG. 10, which is the circuit structure of the light source board of the emergency lighting device with high safety in accordance with another embodiment of the present invention. As previously stated, the emergency lighting device 1 includes a light source board 14. As shown in FIG. 10, the light source board 14 includes an EMI circuit 141 (with leakage protection function and the surge protection function), a utility power detecting circuit 142, an isolation converting circuit 143 (e.g., CC/CV power source), a charging control circuit 144, a low-voltage power source 145, a rechargeable battery 146, a controller 147 (e.g., MCU, CPU, ASIC, FPGA, etc.), a converting circuit 148 (e.g., buck converter, boost converter, a buck-boost converter, etc.), a warning circuit 149 (e.g., light indicator, buzzer, etc.) and a light source 140 (e.g., a LED, a plurality of LEDs, a LED array, etc.).

The EMI circuit 141 is electrically connected to the external power source EP (e.g., the utility power) via the holders 12. The EMI circuit 141 can the rectifying function and the filtering function. Besides, the EMI circuit 141 can further provide the EMI protection function and the surge protection function so as to make sure that the light source board 14 can normally operate. In addition, the EMI circuit 141 can further provide the leakage protection function, which can make sure that the leakage current is less than 5 mA in order to protect the user. The power signal outputted by the external power source EP can be rectified and filtered by the EMI circuit 141.

The isolation converting circuit 143 can enter the constant-current (CC) mode convert the power signal outputted by the EMI circuit 141 so as to drive the light source 149. When the light source 149 is turned off, the isolation converting circuit 143 can enter the constant-voltage (CV) mode so as to provide energy for the low-voltage power source 145 and rechargeable battery 146.

The light source 149 can provide two or more color temperatures for the user to choose from.

The utility power detecting circuit 142 can detect whether the external power source EP normally operates or not. When the utility power detecting circuit 142 detects that the power signal provided by the external power source EP is less than 30V, the utility power detecting circuit 142 transmits a high-level signal to the controller 147, such that the controller 147 can determine whether to enter the emergency mode.

The controller 147 can make sure that the rechargeable battery 146 normally and safely operates and monitor the charging process of the rechargeable battery 146. Besides, the controller 147 can properly adjust the charging voltage/charging current of the rechargeable battery 146 via charging control circuit 144 according to the type of the rechargeable battery 146.

When the external power source EP is in the abnormal state (e.g., power failure), the rechargeable battery 146 can provide energy for the low-voltage power source 145 to power the controller 147 so as to make sure the light source board 14 can normally operate. Meanwhile, the rechargeable battery 146 can provide energy for the converting circuit 148 in order to power the light source 140, which can realize the emergency lighting function.

The converting circuit 148 can provide a wide voltage input range (5-60V) so as to power the light source 140.

The warning circuit 149 can generate a warning signal (e.g., warning light or warning voice) when the rechargeable battery 146 is disconnected.

When the emergency lighting device 1 is connected to the external power source EP, the controller 147 is initialized. In the meanwhile, the utility power detecting circuit 142 can detect whether the external power source EP normally operates or not. If the external power source EP normally operates, the controller 147 enters the main lighting mode and charges the rechargeable battery 146. If the external power source EP does not normally operate, the controller 147 enters the emergency lighting mode.

The emergency lighting device 1 may further include a button connected to the controller 147, which can be used to control the controller 147 to enter the test mode, the transportation mode or other modes.

The circuit structures and the functions of the above circuits are already known by those skilled in the art, so will not be described herein again.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the emergency lighting device with high safety includes a fixture base, two holders and a light tube. The two holders are disposed on the fixture base. Each of the holder includes a holder body, two conductive plates and a rotational fixture. The conductive plates are disposed in the holder body and the rotational fixture is disposed in the central recess of the holder body. The light tube has two end caps and a tube body. The end caps are installed on the holders respectively. Each of the end caps has a non-conductive pin and two conductive pins inserted into the rotational fixture of one of the holders, such that the conductive pins of the end cap contact the conductive plates of the holder respectively. Due to the special structure designs of the end caps and the holders of the emergency lighting device can effectively avoid that the emergency lighting device is incorrectly installed, which can avoid that the emergency lighting device is damaged and prevent from electrical shock. Therefore, the service life of the emergency lighting device can be extended and the safety of the emergency lighting device can be enhanced.

Also, according to one embodiment of the present invention, the end caps and the holders of the emergency lighting device have special structure designs, which make the light tube be stably fixed at the holders. Thus, the lighting device can achieve high structural stability, which can effectively prevent the light tube from dropping from the fixture base. As a result, the service life of the emergency lighting device can be further extended and the safety of the lighting device can be further enhanced.

Further, according to one embodiment of the present invention, the emergency lighting device has the color temperature adjusting button, which can provide the color temperature adjusting function. The user can adjust the color temperature of the emergency lighting device according to actual requirements via the color temperature adjusting button. Thus, the emergency lighting device can be more comprehensively in application and more flexible in use.

Moreover, according to one embodiment of the present invention, the emergency lighting device has the operating state test button, which can provide the operating state monitoring function. Therefore, the user can monitor the operating state of the emergency lighting device via the operating state test button and take the necessary measures on time, which can make sure that the lighting system can normally work.

Furthermore, according to one embodiment of the present invention, the structure design of the emergency lighting device is simple, which can make sure that the emergency lighting device can achieve the desired technical effects without significantly increasing the cost thereof. Accordingly, the emergency lighting device can achieve high practicality.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An emergency lighting device with high safety, comprising:

a fixture base;

two holders disposed on the fixture base, wherein each of the holder comprises a holder body, two conductive plates and a rotational fixture, and the conductive plates are disposed in the holder body and the rotational fixture is disposed in a central recess of the holder body; and a light tube having two end caps and a tube body, wherein the end caps are installed on the holders respectively, and each of the end caps having a non-conductive pin and two conductive pins inserted into the rotational fixture of one of the holders, whereby the conductive pins of the end cap contact the conductive plates of the holder respectively.

2. The emergency lighting device with high safety as claimed in claim 1, wherein each of the holders further comprises three top holes disposed on a top of the holder body.

3. The emergency lighting device with high safety as claimed in claim 2, further comprising a fixing element disposed in one of the top holes of one of the holders.

4. The emergency lighting device with high safety as claimed in claim 1, wherein each of the holders further comprises a fixing base disposed in the holder body thereof and the conductive plates of the holder are fixed at the fixing base of the holder.

5. The emergency lighting device with high safety as claimed in claim 1, wherein each of the holders further comprises a central post disposed in the central recess of the holder body thereof, and the rotational fixture of the holder has a middle hole and the central post of the holder penetrates through the middle hole of the rotational fixture of the holder, whereby the rotational fixture of the holder is rotatably connected to the central post of the holder.

6. The emergency lighting device with high safety as claimed in claim 1, wherein the rotational fixture has a first positioning block set comprising two first positioning blocks, a second positioning block set comprising two second positioning blocks, a third positioning block set comprising two third positioning blocks and a fourth positioning block set comprising two fourth positioning blocks, wherein the first positioning block set is opposite to the third positioning block set, and the second positioning block set is opposite to the fourth positioning block set.

7. The emergency lighting device with high safety as claimed in claim 6, wherein one of the conductive plates contacts the second positioning block set and another of the conductive plates contacts the fourth positioning block set.

8. The emergency lighting device with high safety as claimed in claim 6, wherein one of the conductive pins of one of the end caps presses against an outer side of one of the second positioning blocks, and another of the conductive pins of the end cap presses against an outer side of one of the fourth positioning blocks, wherein the non-conductive pin of the end cap is disposed between the third positioning blocks.

9. The emergency lighting device with high safety as claimed in claim 1, further comprising a color temperature adjusting button disposed on the light tube.

10. The emergency lighting device with high safety as claimed in claim 1, further comprising an operating state test button disposed on the light tube.

* * * * *